United States Patent [19]
Meyer

[11] Patent Number: 6,068,241
[45] Date of Patent: May 30, 2000

[54] NON-SLIPPING PULLEY

[75] Inventor: Leon G. Meyer, Alden, N.Y.

[73] Assignee: Occidental Chemical Corporation, Dallas, Tex.

[21] Appl. No.: 09/211,243

[22] Filed: Dec. 14, 1998

[51] Int. Cl.[7] ....................................................... B66D 3/04
[52] U.S. Cl. .......................... 254/390; 254/902; 29/892; 242/155 R; 474/166; 474/174
[58] Field of Search ...................................... 254/390, 902; 242/155 R; 29/892, 892.1, 893, 894; 474/166, 172, 174

[56] References Cited

U.S. PATENT DOCUMENTS

| | | | |
|---|---|---|---|
| 3,633,432 | 1/1972 | Horsey | 74/230.11 |
| 4,710,152 | 12/1987 | Ichikawa et al. | 474/166 |
| 4,794,816 | 1/1989 | Serizawa et al. | 474/166 X |
| 5,154,401 | 10/1992 | Schramm et al | 254/390 X |
| 5,398,433 | 3/1995 | Dretzka | 254/390 X |
| 5,476,423 | 12/1995 | Meyer | 474/166 |
| 5,843,264 | 12/1998 | Mabuchi et al. | 29/892.1 X |

*Primary Examiner*—Donald P. Walsh
*Assistant Examiner*—Emmanuel M. Marcelo
*Attorney, Agent, or Firm*—Anne E. Brookes; Richard D. Fuerle

[57] ABSTRACT

Disclosed is a pulley that comprises a metal bearing with an elastomeric material on its outer rim molded into a polymeric wheel, where the coefficient of thermal expansion of the polymeric wheel is at least $1.0 \times 10^{-6}$ cm/cm/°C. greater than the coefficient of thermal expansion of the metal bearing. The pulley is made by applying an elastomeric material to the outer edge of the metal bearing and molding the polymeric wheel around it. The use of the elastomeric material prevents slippage between the metal bearing and the polymeric wheel.

20 Claims, 1 Drawing Sheet

NON-SLIPPING PULLEY

BACKGROUND OF THE INVENTION

This invention relates to a pulley having a polymeric wheel molded around a metal bearing. In particular, it relates to the use of an elastomer in between the metal bearing and the polymeric wheel to prevent slippage therebetween.

In order to make pulleys lighter and less expensive, they are often made with a steel bearing surrounded by a polymeric wheel. While the pulley can be constructed so that the metal bearing snaps into place, many pulley manufacturers prefer a molded-in bearing because the polymeric wheel can be made to overlap the bearing and prevent it from dislodging. However, the coefficients of thermal expansion of the metal bearing and the polymeric wheel can differ and, when the pulley becomes hot, the polymeric wheel can expand and separate from the metal bearing. This results in slippage between the bearing and the wheel and failure of the pulley. While this problem can be overcome by using polymers that are more temperature stable, such as glass filled phenolics and nylons, they are more than twice as expensive as unfilled materials.

SUMMARY OF THE INVENTION

I have discovered that a pulley can be made of a metal bearing molded into a polymeric wheel, where the polymeric wheel has a significantly higher coefficient of thermal expansion than the metal bearing, if an elastomer is placed in between the metal bearing and the polymeric wheel. In the pulley of this invention, a standard off-the-shelf bearing can be used and the only additional step is to apply the elastomeric to the outer edge of the bearing. Inexpensive, unfilled polymeric material can be used to mold the wheel.

DESCRIPTION OF THE PREFERRED EMBODIMENTS

Figure 1:
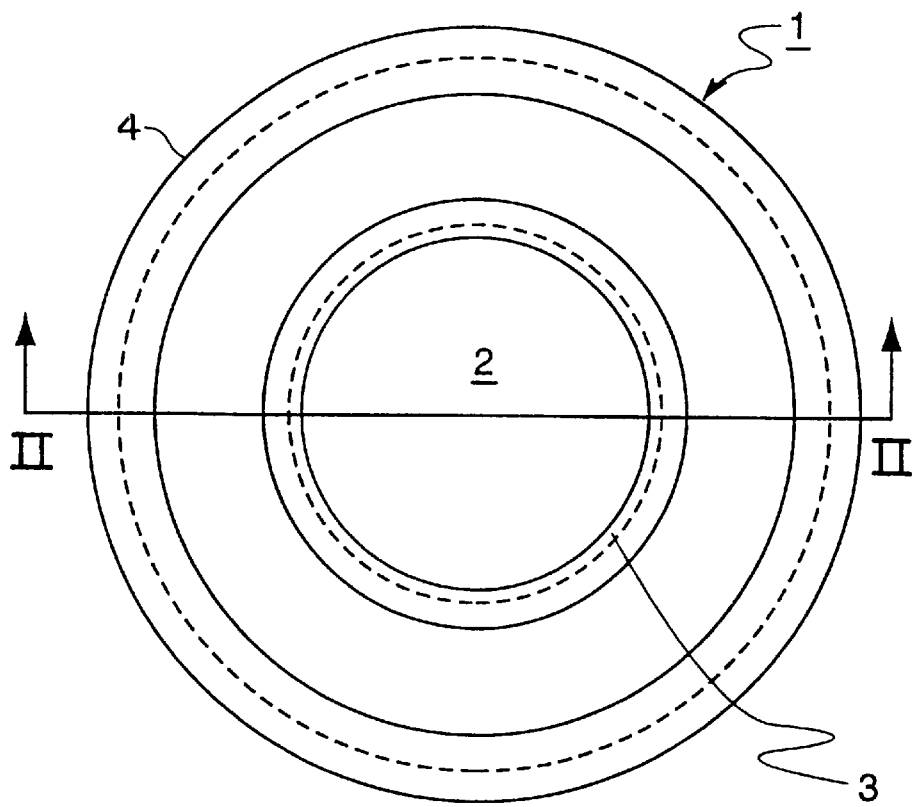
FIG. 1 is a plan view showing a certain presently preferred embodiment of a pulley according to this invention.
Figure 2:
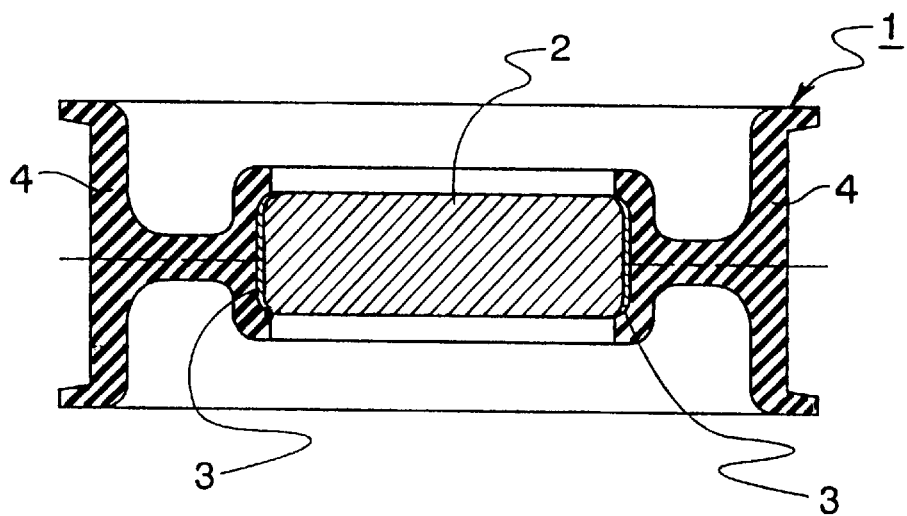
FIG. 2 is a side view in section through II—II of the pulley of FIG. 1.

In the drawings, a pulley 1 is composed of a metallic bearing 2 containing ball bearings (not shown). On the outer edge of bearing 2 is elastomeric material 3. A polymeric wheel 4 has been molded over elastomeric material 3 and a portion of bearing 2.

The bearings used in this invention are typically made of steel although they can also be made of brass, stainless steel, or other metals. The bearing surface in contact with the elastomeric material does not have any ridges, bumps, or other mechanical locks on it, but it can be roughened to help the elastomeric material adhere to it.

The elastomeric material is preferably a nitrile rubber as that bonds well both to polymeric materials and to steel. Other elastomeric materials, such as polyurethane and silicones, can also be used. The elastomeric material should be about 0.005 to ⅛ inch in thickness as less is ineffective and more may permit the pulley to move off center and vibrate; the preferred thickness range is about 0.010 to about 0.080 inches. If the elastomeric material is in solution, it can be applied to the outer rim of the bearing by any appropriate means, such as painting or spraying, followed by evaporation of the solvent. If the elastomeric material is a film, it can be coated with an adhesive and pressed against the bearing.

The polymeric wheel can be made of any thermosetting or thermoplastic polymer, such as phenol formaldehyde, melamine formaldehyde, a crosslinked polyester, nylon, polypropylene, or acrylonitrile-butadiene-styrene. Thermosetting plastics are preferred and phenol formaldehyde is especially preferred as it is inexpensive and has excellent properties for this application. The coefficient of thermal expansion of the polymeric material that forms the wheel should be at least $1.0 \times 10^{-6}$ cm/cm/°C. greater than the coefficient of thermal expansion of the metal that forms the bearing in order for the invention to be useful, and it is preferably at least $5.0 \times 10^{-6}$ cm/cm/°C. greater.

The bearing with the elastomeric material on it is placed in a mold and the pulley is molded around it. Injection or compression molding can be used. The wheel preferably overlaps the bearing to prevent it from dislodging.

The pulleys are typically about 2 to about 6 inches in diameter although larger or smaller pulleys can be made. They are used in the automobile industry to drive air conditioners, water pumps, and other components of a car and in other applications.

I claim:

1. A pulley comprising a metal bearing molded into a polymeric wheel that has a coefficient of thermal expansion at least $1.0 \times 10^{-6}$ cm/cm/°C. greater than the coefficient of thermal expansion of said metal bearing, where an elastomeric material is in between said metal bearing and said polymeric wheel.

2. A pulley according to claim 1 wherein said polymeric wheel is made from a thermosetting plastic.

3. A pulley according to claim 2 wherein said thermosetting plastic is phenol formaldehyde.

4. A pulley according to claim 1 wherein said elastomeric material is a nitrile rubber.

5. A pulley according to claim 1 wherein said elastomeric material is about 0.005 to about ⅛ inches in thickness.

6. A pulley according to claim 1 wherein the diameter of said pulley is about 2 to about 6 inches.

7. A pulley according to claim 1 wherein said elastomeric material is a coating on an outer edge of said bearing.

8. A pulley according to claim 1 wherein said bearing is made of steel.

9. A pulley according to claim 1 wherein said polymeric wheel overlaps said bearing to prevent said bearing from dislodging from said polymeric wheel.

10. A method of making a pulley according to claim 1 comprising coating said bearing with said elastomeric material, placing said coated bearing into a mold and molding polymeric material around said coated bearing.

11. A method according to claim 10 wherein said molding is compression molding.

12. A method according to claim 10 wherein said molding is injection molding.

13. A method of making a pulley according to claim 1 comprising bonding said elastomeric material to said bearing, placing said bearing inside a mold, and molding polymeric material around said bearing.

14. A method according to claim 13 wherein said molding is compression molding.

15. A method according to claim 13 wherein said molding is injection molding.

16. A pulley comprising a steel bearing coated with about 0.010 to about 0.080 inches of an elastomeric material on its outer edge, molded into a phenol formaldehyde wheel, where said wheel overlaps said bearing to prevent said bearing from dislodging from said wheel.

17. A pulley according to claim 16 wherein said elastomeric material is a nitrile rubber.

18. A pulley according to claim 16 that is about 2 to about 6 inches in diameter.

19. A pulley about 2 to about 6 inches in diameter comprising a steel bearing having its outer edge coated with about 0.010 to about 0.080 inches of nitrile rubber molded into a phenol formaldehyde wheel, where said wheel overlaps said bearing to prevent said bearing from dislodging from said wheel.

20. A method of making a pulley according to claim 19 comprising coating the outer edge of said bearing with said nitrile rubber, placing said coated bearing inside a mold, and molding said phenol formaldehyde wheel around said bearing.

* * * * *